: US 12,421,970 B2
(45) Date of Patent: Sep. 23, 2025

(12) United States Patent
Yanagisawa et al.

(54) AXIAL FAN HAVING CONTROL BOARD COVER WITH WINDOWS AT TOP SURFACE AND SIDE PERIPHERAL SURFACE OF CONTROL BOARD COVER

(71) Applicant: SANYO DENKI CO., LTD., Tokyo (JP)

(72) Inventors: Atsushi Yanagisawa, Tokyo (JP); Katsumichi Ishihara, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 33 days.

(21) Appl. No.: 18/423,995

(22) Filed: Jan. 26, 2024

(65) Prior Publication Data

US 2024/0309877 A1    Sep. 19, 2024

(30) Foreign Application Priority Data

Mar. 17, 2023   (JP) .................. 2023-042960

(51) Int. Cl.
F04D 25/06 (2006.01)
F04D 19/00 (2006.01)
F04D 29/52 (2006.01)
F04D 29/66 (2006.01)
H02K 5/10 (2006.01)

(52) U.S. Cl.
CPC ....... F04D 25/0693 (2013.01); F04D 19/002 (2013.01); F04D 25/0613 (2013.01); F04D 25/068 (2013.01); F04D 29/52 (2013.01); F04D 29/66 (2013.01); F04D 29/667 (2013.01); H02K 5/10 (2013.01)

(58) Field of Classification Search
CPC ............. F04D 13/0693; F04D 25/0693; F04D 19/00–048; F04D 3/00–02; H02K 5/10
See application file for complete search history.

(56) References Cited

U.S. PATENT DOCUMENTS

2002/0024264 A1* 2/2002 Matsumoto ......... F04D 25/0613
310/68 R
2009/0263242 A1* 10/2009 Winkler ................ F04D 29/601
415/213.1

(Continued)

FOREIGN PATENT DOCUMENTS

JP       3432380 B2 *  8/2003
JP       2008-196504 A  8/2008

Primary Examiner — Laert Dounis
(74) Attorney, Agent, or Firm — Rankin, Hill & Clark LLP

(57) ABSTRACT

An axial fan includes an impeller configured to be driven by a motor and rotate about a rotation axis, a control board configured to supply electric power to the motor, and a cover portion covering the control board, in which a lead wire is attached to the control board, the cover portion includes a top surface facing the control board; and a side peripheral surface extending from the top surface in a direction of the rotation axis, the top surface is provided with a first window portion, the first window portion is configured to allow a potting agent that seals the lead wire to be introduced therethrough, the side peripheral surface is provided with a second window portion, the second window portion is configured to allow the lead wire to be pulled out therethrough, and the first window portion is separated from the second window portion by a bridge portion.

8 Claims, 3 Drawing Sheets

(56) References Cited

U.S. PATENT DOCUMENTS

2015/0084569 A1\* 3/2015 Chou ................. F04D 25/0613
  318/494
2020/0303990 A1\* 9/2020 Takakuwa .............. H02K 11/33

\* cited by examiner

AXIAL FAN HAVING CONTROL BOARD COVER WITH WINDOWS AT TOP SURFACE AND SIDE PERIPHERAL SURFACE OF CONTROL BOARD COVER

CROSS-REFERENCE TO RELATED APPLICATION

This application is based on Japanese Patent Application No. 2023-042960 filed with the Japan Patent Office on Mar. 17, 2023, the entire content of which is hereby incorporated by reference.

BACKGROUND

1. Technical Field

The present disclosure relates to an axial fan.

2. Related Art

JP-A-2008-196504 discloses an axial fan that can reduce the generation of noise.

In a standard configuration of the axial fan described in JP-A-2008-196504, a notch is provided in a housing to pull out a lead wire extending from a motor.

However, according to the above configuration, air or dust flows in through the notch provided in the housing. Hence, electrical characteristics result in decreasing due to, for example, a corroded soldered part.

Hence, an object of the present disclosure is to provide an axial fan that has a simple configuration and can suppress a decrease in electrical characteristics.

SUMMARY

An axial fan according to an embodiment of the present disclosure includes an impeller configured to be driven by a motor and rotate about a rotation axis, a control board configured to supply electric power to the motor, and a cover portion covering the control board, in which a lead wire is attached to the control board, the cover portion includes a top surface facing the control board; and a side peripheral surface extending from the top surface in a direction of the rotation axis, the top surface is provided with a first window portion, the first window portion is configured to allow a potting agent that seals the lead wire to be introduced therethrough, the side peripheral surface is provided with a second window portion, the second window portion is configured to allow the lead wire to be pulled out therethrough, and the first window portion is separated from the second window portion by a bridge portion.

DETAILED DESCRIPTION

Figure 1:
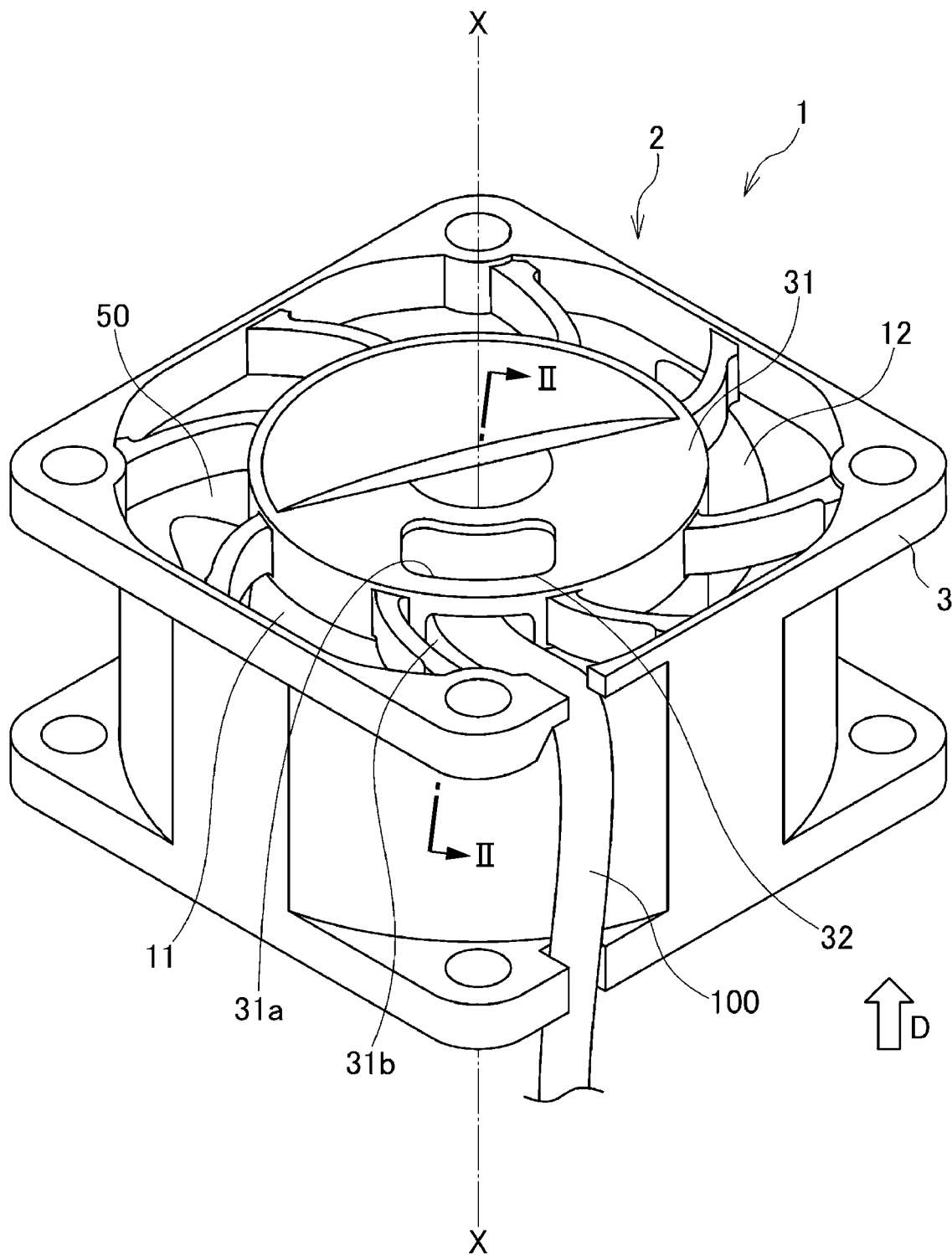
FIG. 1 is a perspective view of an axial fan according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An axial fan according to one aspect of the present disclosure includes an impeller configured to be driven by a motor and rotate about a rotation axis, a control board configured to supply electric power to the motor, and a cover portion covering the control board, in which a lead wire is attached to the control board, the cover portion includes a top surface facing the control board; and a side peripheral surface extending from the top surface in a direction of the rotation axis, the top surface is provided with a first window portion, the first window portion is configured to allow a potting agent that seals the lead wire to be introduced therethrough, the side peripheral surface is provided with a second window portion, the second window portion is configured to allow the lead wire to be pulled out therethrough, and the first window portion is separated from the second window portion by a bridge portion.

According to the embodiment, it is possible to provide an axial fan that has a simple configuration and can suppress a decrease in electrical characteristics.

The embodiment is described hereinafter with reference to the drawings. Note that descriptions of members having the same reference numerals as members already described are omitted in the detailed description for convenience. Moreover, the dimensions of each member illustrated in the drawings may be different from actual dimensions thereof for the convenience of description.

FIG. 1 is a perspective view illustrating an example of an axial fan 1 according to the embodiment. As illustrated in FIG. 1, the axial fan 1 is a fan that produces an air current W along an air-blowing direction D indicated by an arrow. The axial fan 1 includes a casing 2, and an impeller 10 (refer to FIG. 2) that rotates about a rotation axis X relative to the casing 2. The lower side of the rotation axis X extending in an up-and-down direction in FIG. 1 may be referred to as upstream. Moreover, the upper side of the rotation axis X may be referred to as downstream.

Figure 2:
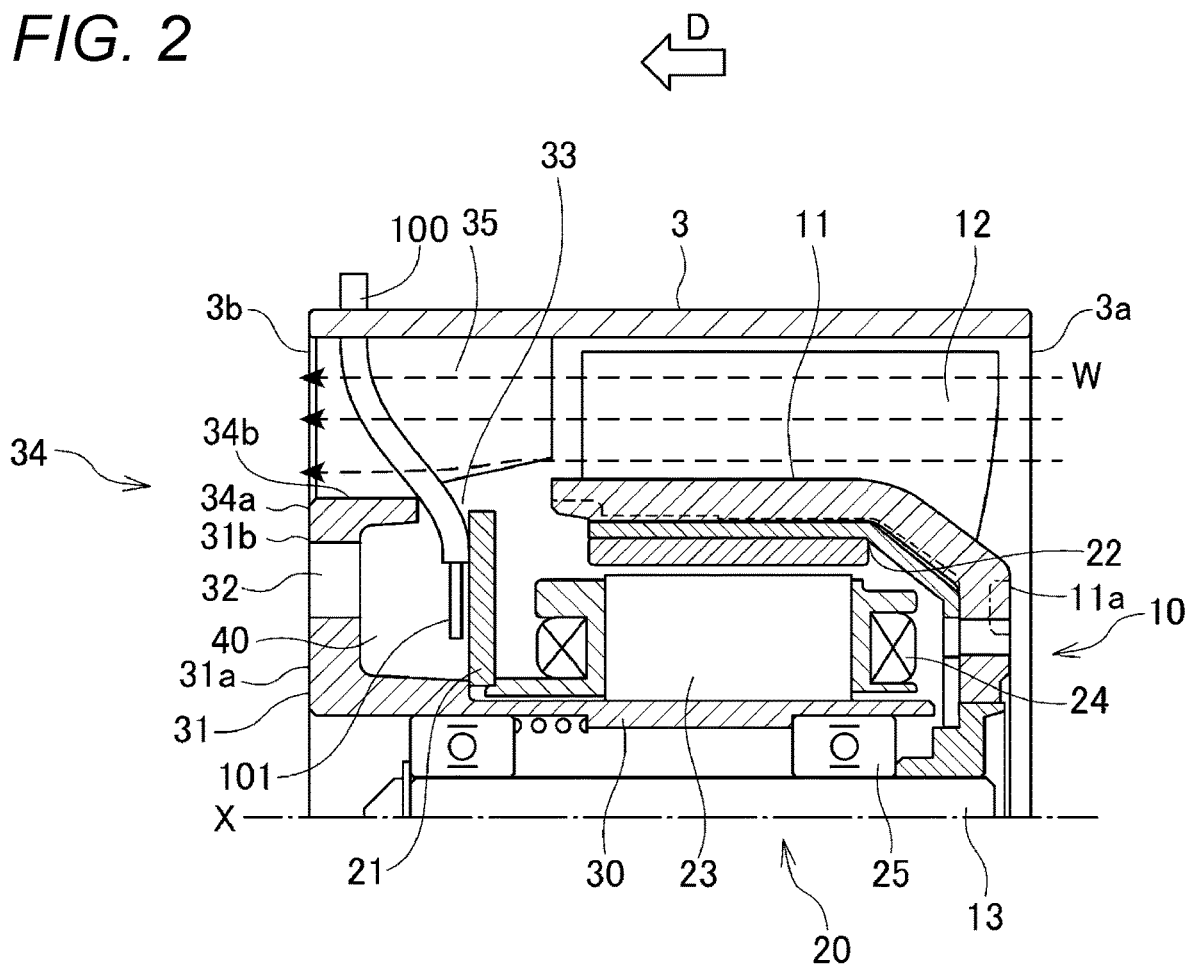
FIG. 2 is a cross-sectional view of an axial fan 1 illustrated in FIG. 1, taken along II-II.
Figure 3:
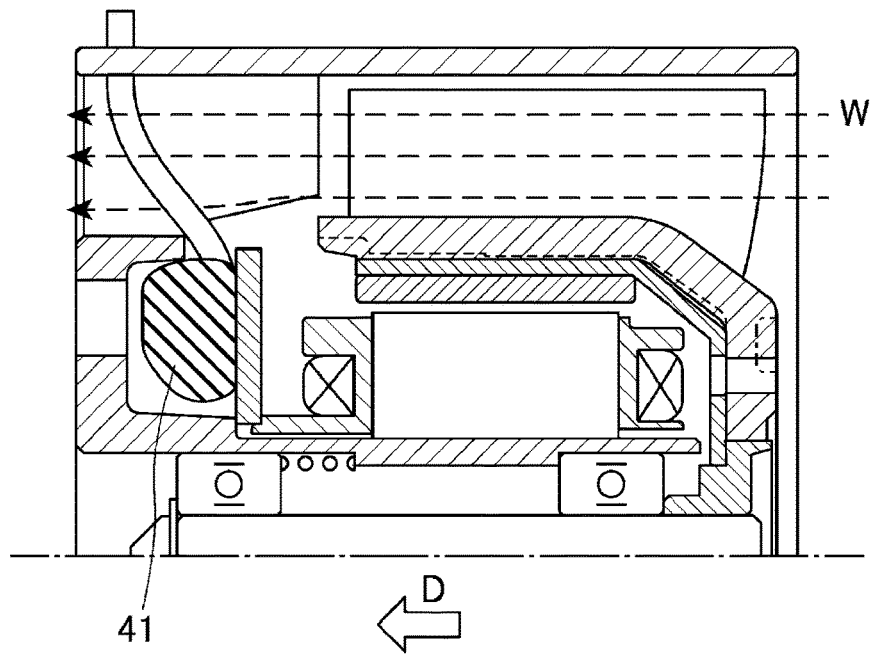
FIG. 3 is a cross-sectional view of the axial fan 1 illustrated in FIG. 1, taken along II-II.

FIGS. 2 and 3 are cross-sectional views of the axial fan 1 illustrated in FIG. 1, taken along II-II. As illustrated in FIGS. 2 and 3, the casing 2 includes an outer frame portion 3, a supporting tube portion 30, and a fixed blade 35. A cylindrical inner space 50 delimited by the outer frame portion 3 and the impeller 10 communicates with an air inlet 3a and an outlet 3b. The supporting tube portion 30 is a tubular metal member extending in a direction of the rotation axis X. The central axis of the supporting tube portion 30 agrees with the rotation axis X. A rotary shaft portion 13 is provided inside the supporting tube portion 30.

A stator coil 24 is provided on an outer peripheral surface of the supporting tube portion 30 via a stator holder 23. A control board 21 that controls the stator coil 24 is provided downstream of the stator holder 23. The control board 21 is sandwiched and fixed between a step portion provided on the outer peripheral surface of the supporting tube portion 30, and the stator holder 23.

A downstream end of the supporting tube portion 30 forms a part of a cover portion 31. The cover portion 31 is a disk-like member that covers a downstream surface of the control board 21. The cover portion 31 suppresses ingress of, for example, dust to the control board 21 from the downstream side.

The cylindrical inner space 50 separates a radially outer peripheral surface of the cover portion 31 from the outer frame portion 3. The fixed blade 35 is provided in such a manner as to connect the outer frame portion 3 and the cover portion 31. The fixed blade 35 is provided downstream of the inner space 50. The fixed blade 35 rectifies the air current W produced by the impeller 10 to cause the air current W to flow downstream of the axial fan 1. Consequently, air-blowing efficiency increases. The impeller 10 rotates about the rotation axis X relative to the casing 2. The impeller 10 includes an impeller cup 11, a blade portion 12, and the rotary shaft portion 13.

The rotary shaft portion 13 is a member extending in the direction of the rotation axis X. The rotary shaft portion 13 is provided inside the supporting tube portion 30. The supporting tube portion 30 rotatably supports the rotary shaft portion 13 via a bearing 25.

The impeller cup 11 is a bottomed cylindrical member. The impeller cup 11 is provided in an attitude in which a bottom portion 11a is located upstream. The central axis of the impeller cup 11 is provided in such a manner as to agree with the rotation axis X. The bottom portion 11a of the impeller cup 11 is connected to the rotary shaft portion 13.

The blade portion 12 is provided on an outer peripheral surface of the impeller cup 11. The blade portion 12 is provided in the inner space 50. A magnet 22 is fixed to an inner peripheral surface of the impeller cup 11. When the stator coil 24 is energized, the interaction between the stator coil 24 and the magnet 22 causes the impeller cup 11 to rotate. The above configuration allows the impeller 10 to rotate about the rotation axis X with the rotation of the rotary shaft portion 13 and therefore the air current W can be sent downstream.

Figure 4B:
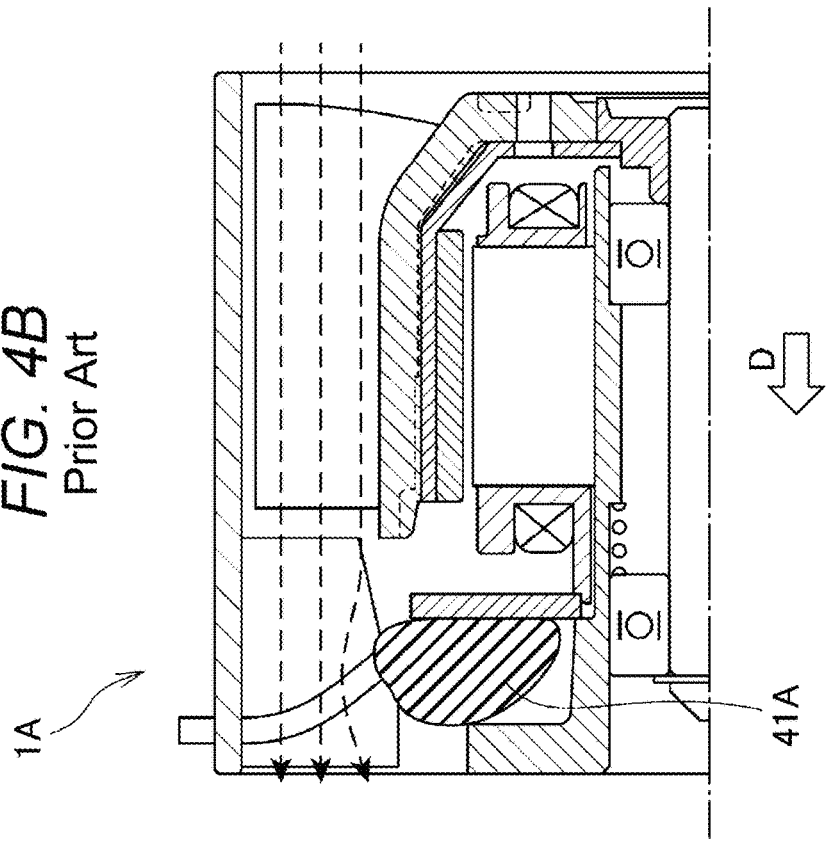
FIGS. 4A and 4B are axial cross-sectional views of a standard axial fan 1A.
Figure 4A:
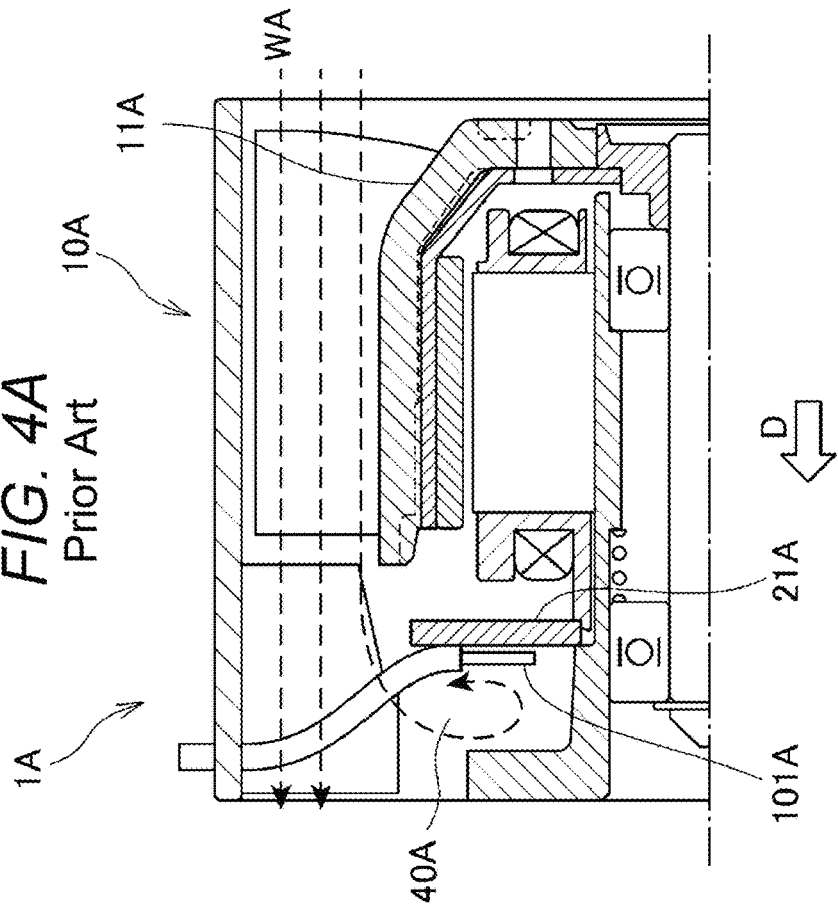

FIGS. 4A and 4B are cross-sectional views illustrating the cross-section of a standard axial fan 1A taken along an axial direction. The configuration of the axial fan 1A illustrated in FIGS. 4A and 4B generally agrees with that of the axial fan 1 according to the embodiment. The configuration allows an impeller 10A to produce an air current WA.

In the standard axial fan 1A, a notch portion 40A is provided in the cover portion 31 to pull out a lead wire connected to a control board 21A. However, as illustrated in FIG. 4A, a large part of the control board 21A and a lead wire bonding portion 101A is exposed through the notch portion 40A provided in the cover portion 31.

Furthermore, when the air current WA is produced in a wind tunnel space, a place that is provided with the notch portion 40A in the cover portion 31 is placed radially inward of an impeller cup 11A and other places, in a space through which the air current WA passes. Hence, the air current WA results in flowing to the bonding portion 101A, which causes the air current WA to flow from the notch portion 40A to the surround of the bonding portion 101A. As a result, the loss of the air current WA is caused. Moreover, dust that enters through the notch portion 40A and builds up on the bonding portion 101A causes corrosion of the bonding portion 101A. As a result, this reduces the life of the bonding portion 101A.

Note that in the standard axial fan 1A, as illustrated in FIG. 4B, a potting agent 41A that seals the bonding portion 101A may be applied to protect the bonding portion 101A. However, when the potting agent 41A is introduced through the notch portion 40A, the potting agent 41A often spills out from the control board and inhibits the flow of the air current WA. Hence, when the potting agent 41A is applied in an assembly process of the axial fan 1A, a worker needs to pay attention to the amount and place to apply the potting agent 41A. As a result, there arises a problem that the work is complex.

Hence, the axial fan 1 according to the present disclosure is provided with the cover portion 31 for protecting the control board 21. The cover portion 31 is a plate-shaped member that closes an opening in a direction of the outlet 3b in the impeller cup 11. The cover portion 31 includes a top surface 31a facing in the direction of the rotation axis X, and an edge portion 31b facing in the radial direction of the impeller cup 11. At least a part of the edge portion 31b extends in the direction of the rotation axis X.

The cover portion 31 further includes a first window portion 32 that is open in the top surface 31a, and a second window portion 33 that is open in the edge portion 31b. The first window portion 32 is separated from the second window portion 33 by a bridge portion 34. The bridge portion 34 includes a top surface 34a facing in the direction of the rotation axis X, and a side peripheral surface 34b facing in the radial direction of the impeller cup 11. Note that the side peripheral surface 34b of the bridge portion 34 and the edge portion 31b of the cover portion 31 are provided in such a manner as to be located radially inward of a side surface of the impeller cup 11.

As illustrated in FIG. 2, the cover portion 31, the bridge portion 34, and the control board 21 delimit a bonding chamber 40 inside the axial fan 1. The control board 21 of a motor 20 is connected to a lead wire 100 and a bonding portion 101 in the bonding chamber 40. For example, solder is used for the bonding portion 101. In the axial fan 1 according to the embodiment, the potting agent 41 may be introduced into the bonding chamber 40 for the purpose of protecting the bonding portion 101 and increasing the connection strength of the bonding portion 101.

When the control board 21 and the lead wire 100 are bonded together in the assembly process of the axial fan 1, the first window portion 32 provided in the cover portion 31 can be used. For example, the bonding portion 101 can be created through the first window portion 32. Similarly, the potting agent 41 can be introduced through the first window portion 32. Moreover, when the lead wire 100 connected to the control board 21 is pulled out of the bonding chamber 40, the second window portion 33 provided in the cover portion 31 can be used.

The above configuration allows the potting agent 41 to be introduced through the first window portion 32. Moreover, the bridge portion 34 is provided, so that it is possible to avoid a situation in which air comes around to the control board 21. As a result, the durability of the bonding portion 101 of the lead wire 100 can be increased. Moreover, the bridge portion 34 allows the loss of the flow of air to be reduced while suppressing the spilling out of the potting agent 41.

Moreover, in the axial fan 1 according to the present disclosure, at least a part of the bridge portion 34 extends in the direction of the rotation axis. Consequently, it is possible to avoid the spilling out of the potting agent 41 when the potting agent 41 is applied to the bonding portion 101 of the lead wire 100. As a result, it is possible to prevent the loss of the flow of air.

Moreover, in the axial fan 1 according to the embodiment, an outer peripheral surface of the bridge portion 34 is located radially inward of the outer peripheral surface of the impeller cup 11. Consequently, when the air current W flows downstream, its flow is not inhibited.

Up to this point the details of the axial fan according to the embodiment have been described. However, the configuration of the axial fan according to the embodiment is not limited to the above-mentioned configuration. For example, the lead wire 100 may be pressed by the edge portion 31b that delimits the second window portion 33. The above configuration allows the lead wire 100 to be pressed by the edge portion 31b that delimits the second window portion 33 also when an external force is added to the lead wire 100. Hence, the durability of the bonding portion 101 increases.

Moreover, the first window portion 32 may be covered with a seal. According to the above configuration, it is difficult for air to enter the bonding chamber 40 in which the lead wire 100 and the control board 21 are bonded together since the first window portion 32 is covered with the seal. Hence, the durability of the bonding portion 101 of the lead wire 100 can be increased.

Up to this point the embodiment has been described. However, it is needless to say that the technical scope of the embodiment should not be construed in a limited manner by the above-mentioned detailed description. The above-mentioned embodiment is a mere example. Those skilled in the art understand that the above-mentioned embodiment can be modified in various manners within the scope described in the claims. The technical scope of the embodiment should be determined on the basis of the scope described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An axial fan comprising:
   an impeller configured to be driven by a motor and rotate about a rotation axis;
   a control board configured to supply electric power to the motor; and
   a cover portion covering the control board, wherein
   a lead wire is attached to the control board,
   the cover portion includes:
   a top surface facing the control board; and
   a side peripheral surface extending from the top surface in a direction of the rotation axis,
   the top surface is provided with a first window portion,
   the first window portion is configured to allow a potting agent that seals the lead wire to be introduced therethrough,
   the side peripheral surface is provided with a second window portion,
   the second window portion is configured to allow the lead wire to be pulled out therethrough, and
   the first window portion is separated from the second window portion by a bridge portion.

2. The axial fan according to claim 1, wherein at least a part of the bridge portion extends along the direction of the rotation axis.

3. The axial fan according to claim 1, wherein
   the impeller includes an impeller cup and a blade portion extending radially from the impeller cup, and
   an outer peripheral surface of the bridge portion is located radially inward of an outer peripheral surface of the impeller cup.

4. The axial fan according to claim 2, wherein
   the impeller includes an impeller cup and a blade portion extending radially from the impeller cup, and
   an outer peripheral surface of the bridge portion is located radially inward of an outer peripheral surface of the impeller cup.

5. The axial fan according to claim 1, wherein the lead wire is pressed by an edge portion delimiting the second window portion.

6. The axial fan according to claim 2, wherein the lead wire is pressed by an edge portion delimiting the second window portion.

7. The axial fan according to claim 1, wherein the first window portion is covered with a seal.

8. The axial fan according to claim 2, wherein the first window portion is covered with a seal.

* * * * *